(12) United States Patent
Steffan et al.

(10) Patent No.: US 11,320,398 B2
(45) Date of Patent: May 3, 2022

(54) SENSOR ARRANGEMENT FOR VOLTAMMETRY

(71) Applicant: Infineon Technologies AG, Neubiberg (DE)

(72) Inventors: Christoph Steffan, Graz (AT); Inge Siegl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 392 days.

(21) Appl. No.: 16/443,698

(22) Filed: Jun. 17, 2019

(65) Prior Publication Data

US 2020/0003720 A1 Jan. 2, 2020

(30) Foreign Application Priority Data

Jun. 27, 2018 (DE) .......................... 102018115460.7

(51) Int. Cl.
*G01N 27/49* (2006.01)
*G01N 27/416* (2006.01)
*G01N 27/30* (2006.01)

(52) U.S. Cl.
CPC ......... *G01N 27/49* (2013.01); *G01N 27/4167* (2013.01); *G01N 27/302* (2013.01)

(58) Field of Classification Search
None
See application file for complete search history.

(56) References Cited

U.S. PATENT DOCUMENTS

| | | |
|---|---|---|
| 8,659,349 B1 | 2/2014 | Lyden et al. |
| 9,279,781 B2 | 3/2016 | Wilhelm et al. |
| 2008/0227651 A1 | 9/2008 | Zhou et al. |

(Continued)

FOREIGN PATENT DOCUMENTS

| | | |
|---|---|---|
| CN | 101023350 A | 8/2007 |
| CN | 101358985 A | 2/2009 |
| CN | 107003268 A | 8/2017 |

(Continued)

OTHER PUBLICATIONS

Office Action, in the German language, from counterpart German Application No. 102018117202.8, dated Jun. 24, 2019, 4 pp.

(Continued)

*Primary Examiner* — J. Christopher Ball
(74) *Attorney, Agent, or Firm* — Shumaker & Sieffert, P.A.

(57) ABSTRACT

In some examples, a circuit arrangement has a first output node for connection to a first electrode of the electrochemical cell, a second output node for connection to a second electrode of the electrochemical cell and a third output node for connection to a third electrode of the electrochemical cell. The circuit arrangement further has an interface circuit designed to output a first voltage at the first output node and further designed to output a third voltage at the third output node, which third voltage is set such that a second voltage at the second output node corresponds to a reference voltage. A control unit is designed to set the first voltage such that a predetermined cell voltage is applied between the first and the second output node. The control circuit is further designed to adjust the reference voltage depending on the electrical state of the electrochemical cell.

11 Claims, 12 Drawing Sheets

(56) References Cited

U.S. PATENT DOCUMENTS

2013/0248381 A1* 9/2013 Wilhelm ................ G01N 27/30
205/789
2018/0172813 A1 6/2018 Rao et al.

FOREIGN PATENT DOCUMENTS

| | | |
|---|---|---|
| CN | 107688048 A | 2/2018 |
| DE | 102004035245 A1 | 2/2006 |
| DE | 102012101254 A1 | 8/2013 |
| DE | 102013202003 A1 | 8/2014 |
| EP | 0729212 A1 | 8/1996 |
| WO | 2018072949 A1 | 4/2018 |

OTHER PUBLICATIONS

Office Action, in the German language, from counterpart German Application No. 102018115460.7, dated Apr. 25, 2019, 5 pp.
Office Action from counterpart Chinese Application No. 201910567451.6 dated Oct. 11, 2021, 6 pp.

* cited by examiner

SENSOR ARRANGEMENT FOR VOLTAMMETRY

This Application claims priority to German Application Number 102018115460.7, filed on Jun. 27, 2018, the entire content of which is incorporated herein by reference.

TECHNICAL FIELD

The present description relates to the field of electrochemical sensors, in particular a sensor arrangement for use in voltammetric analysis methods.

BACKGROUND

The trend of monitoring various health and fitness parameters is a driving force in the development of biochemical sensors for the consumer goods market. It is important for this market to carry out the necessary measurement processes using cost-effective electronics components which can be produced, for example, by means of standard CMOS processes. Electronics components of this kind typically operate with a supply voltage range (rail-to-rail) of, for example, 3 V or less.

Said measurement methods include, amongst others, amperometry and voltammetry, such as cyclic voltammetry for example, which are carried out with the aid of potentiostats for example. By way of example, the concentrations of specific metal ions in a solution can be determined using measurement methods of said kind. One application example is the measurement of the potassium concentration in the blood of a patient. Commercially available potentiostats or similar devices are generally too expensive for the consumer goods market and uses comparatively complex electronics components which, in comparison to the above-mentioned value of 3 V, have available a relatively large voltage range (for example 6 V) which cannot be readily provided using modern standard CMOS components but may be necessary on account of the electrochemical properties of the materials to be analyzed.

SUMMARY

A circuit arrangement for operating an electrochemical cell is described below. According to one exemplary embodiment, the circuit arrangement has a first output node for connection to a first electrode of the electrochemical cell, a second output node for connection to a second electrode of the electrochemical cell and a third output node for connection to a third electrode of the electrochemical cell. The circuit arrangement further has an interface circuit which is designed to output a first voltage at the first output node, and which is further designed to output a third voltage at the third output node, which third voltage is set such that a second voltage at the second output node corresponds to a reference voltage. A control unit is designed to set the first voltage such that a predetermined cell voltage is applied between the first and the second output node. The control circuit is further designed to adjust the reference voltage depending on the electrical state of the electrochemical cell.

A method for actuating an electrochemical cell is also described. According to one exemplary embodiment, the method comprises applying a first voltage to a first electrode of an electrochemical cell and applying a third voltage to a third electrode of the electrochemical cell, wherein the third voltage is set such that a second voltage at a second electrode of the electrochemical cell corresponds to a reference voltage. The method further comprises setting the first voltage in such a way that a predetermined cell voltage is applied between the first and the second electrode, and adjusting the reference voltage depending on an electrical state of the electrochemical cell.

BRIEF DESCRIPTION OF THE DRAWINGS

Exemplary embodiments will be explained in more detail below with reference to figures. The illustrations are not necessarily to scale and the exemplary embodiments are not restricted only to the illustrated aspects. Rather, importance is attached to illustrating the principles underlying the exemplary embodiments. In the drawings.

DETAILED DESCRIPTION

Cyclic voltammetry (CV) is a measurement and analysis technique which is customary in the field of electrochemistry for qualitatively and quantitatively analyzing a sample and using which the chemical composition of substance mixtures can be determined on the basis of the voltage-dependent current profile. Voltammetry is a form of electrolysis in which the dependence of an electrode current on a voltage which is applied to an electrochemical cell is ascertained. The further examination of the sample involves evaluating the measured current/voltage curves, for example in order to ascertain the concentration of an analyte (for example specific metal ions) contained in the sample.

Figure 1:
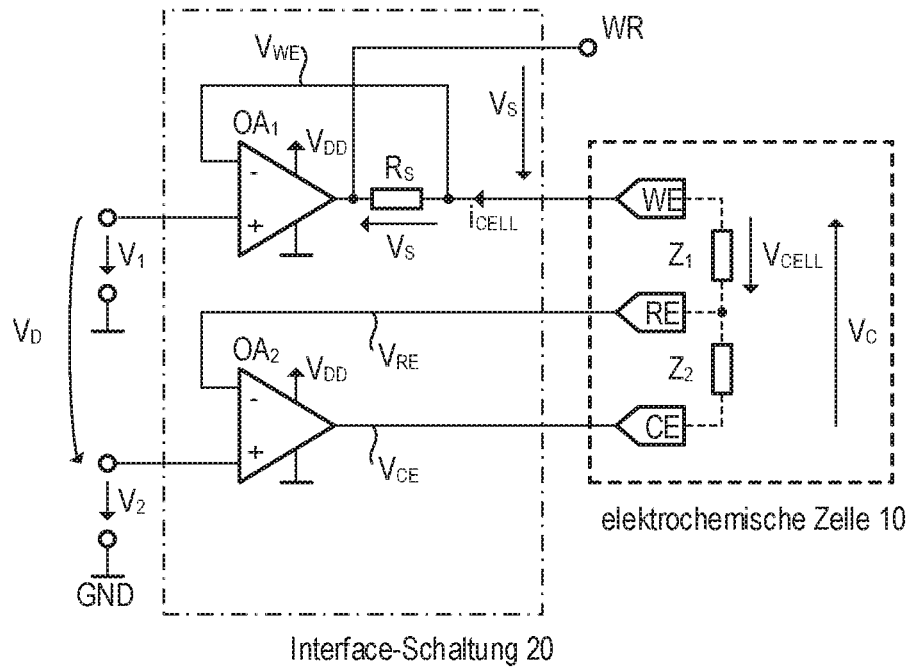
FIG. 1 shows a circuit diagram of an example of an interface circuit for operating an electrochemical cell which is suitable for voltammetric analysis techniques.

FIG. 1 is a circuit diagram of an example of a circuit for operating an electrochemical cell which is suitable for voltammetric analysis techniques. FIG. 1 shows an electrochemical system which is referred to as electrochemical cell 10 below. In the illustrated example, the cell 10 comprises three electrodes which are contained in an electrolyte (the sample to be analyzed). These electrodes are usually referred to as the working electrode WE, the reference electrode RE and the counterelectrode CE, where the counterelectrode is sometimes also called the auxiliary electrode. In electrical terms, the current path between the working electrode WE and the reference electrode RE can be considered to be an impedance $Z_1$ and the current path between the reference electrode RE and the counterelectrode CE can be considered to be an impedance $Z_2$, where these impedances $Z_1$ and $Z_2$ are dependent, amongst other things, on the applied cell voltage $V_{CELL}$, the chemical properties of the electrolyte contained in the cell 10 and the chemical reactions proceeding in the cell. In the example shown in FIG. 1, the cell 10 is an electrical load which is represented by the impedances $Z_1$ and $Z_2$. The cell 10 can also be an electrochemical cell, which operates as a voltage source (with internal resistance), depending on the electrolyte.

In voltammetry, the cell voltage $V_{CELL}$ between the working electrode WE and the reference electrode RE is usually actively set in accordance with a (generally time-dependent) setpoint value. In order to be able to control the cell voltage $V_{CELL}$ sufficiently well, it is usually necessary in practice for the reference electrode RE to remain currentless and for no significant current to flow across the reference electrode RE in order to prevent redox reactions at the reference electrode RE. The counterelectrode CE is required in order to close the electrical circuit. The current through the cell 10 then flows only across the working electrode WE and the counterelectrode CE. The cell voltage used for a specific measurement can be defined by the user. The voltage which has to be applied between the counterelectrode CE and the working electrode WE in order to achieve the desired cell voltage $V_{CELL}$ between the working electrode WE and the (currentless) reference electrode RE is referred to as a compliance voltage $V_C$. The required compliance voltage $V_C$ can be significantly higher than the cell voltage $V_{CELL}$, in particular when the resistance of the electrolyte (impedances $Z_1$, $Z_2$) is high. As mentioned, the cell voltage $V_{CELL}$ can vary over time. In cyclic voltammetry, the cell voltage $V_{CELL}$ has a periodic AC voltage component, whereas the cell voltage is constant in amperometry.

The interface circuit 20 illustrated in FIG. 1 illustrates an example of how the cell voltage $V_{CELL}$ can be set. The circuit 20 can be considered to be an interface between the cell 10 and a superordinate evaluation unit (not illustrated in FIG. 1). The electrode voltages at the working electrode WE, the reference electrode RE and the counterelectrode CE are denoted $V_{WE}$, $V_{RE}$ and, respectively, $V_{CE}$ below, where $V_{CELL}=V_{WE}-V_{RE}$ and $V_C=V_{CE}-V_{WE}$. In the present example, the voltage $V_{WE}$ at the working electrode WE is provided by means of a first amplifier circuit from a first input voltage $V_1$. In the present example, the amplifier circuit contains an operational amplifier $OA_1$ which is interconnected as a buffer amplifier, that is to say the first amplifier circuit has an amplification of one ($V_{WE}=V_1$). The input voltage is applied to the non-inverting input of the operational amplifier $OA_1$ and the output of the operational amplifier $OA_1$ is connected to the inverting input of the operational amplifier $OA_1$ and the working electrode WE via the measurement resistor $R_S$. The measurement resistor $R_S$ is merely one of several ways of measuring the output current (which is equal to the current $i_{CELL}$ through the cell 10) of the operational amplifier $OA_1$. In the illustrated example, the operational amplifier $OA_1$ generates an output voltage of $V_1-V_S=V_{WE}-R_S \cdot i_{CELL}$. The voltage across the measurement resistor $V_S=R_S \cdot i_{CELL}$ (and therefore the current $i_{CELL}$) can be ascertained, for example, using a differential amplifier (not illustrated), the output voltage of which differential amplifier is proportional to the cell current $i_{CELL}$. In the illustrated example, the output voltage of the operational amplifier $OA_1$ is provided at an output node WR. The voltage $V_{WR}$ at the output node WR is equal to $V_{WE}-R_S \cdot i_{CELL}$ and therefore represents the cell current $i_{CELL}$.

The voltage $V_{RE}$ at the reference electrode is set by means of a second amplifier circuit, the output of which is connected to the counterelectrode CE and which sets the voltage $V_{CE}$ at the counterelectrode CE such that a prespecified voltage $V_2$ is applied to the reference electrode RE ($V_{WE}=V_2$). According to the illustrated example, the second amplifier circuit comprises an operational amplifier $OA_2$. The voltage $V_2$ is supplied as input voltage to the non-inverting input of the operational amplifier $OA_2$. The output of the operational amplifier $OA_2$ is connected to the inverting input of the operational amplifier $OA_2$ via a cell 10 (more precisely via the impedance $Z_2$). Owing to the feedback of the operational amplifier $OA_2$, said operational amplifier generates, as output voltage, the voltage $V_{CE}$ at the counterelectrode CE such that $V_{RE} \approx V_2$ with a sufficient degree of accuracy.

It can be seen in FIG. 1 that the voltage $V_{RE}$ at the reference electrode can be directly set (the electrode voltage $V_{RE}$ is equal to the input voltage $V_2$). In known measurement systems, $V_{RE}$ is usually set to a constant value. Furthermore, the cell voltage $V_{CELL}$ can also be directly set (the cell voltage $V_{CELL}$ is equal to the difference $V_1-V_2$ between the input voltages $V_1$ and $V_2$. If, for example, the input voltage $V_2$ is zero volt (ground potential), the electrode voltage $V_{RE}$ is constantly zero volt and the cell voltage $V_{CELL}$ is equal to the input voltage $V_1$ ($V_{RE}=V_2=0V$, $V_{CELL}=V_1$). In this situation, a bipolar supply of the operational amplifiers $OA_1$, $OA_2$ is generally required. In some applications with unipolar supply of the operational amplifiers $OA_1$, $OA_2$ (supply voltage $V_{DD}$), the reference electrode CE can be connected, for example, to half the supply voltage (that is to say $V_2=V_{DD}/2$). In this case, the maximum value of $V_{DD}/2+|V_{CELL}|$ is retained for the compliance voltage $V_C$, but this may be too low for some applications if the supply voltage $V_{DD}$ lies in a range (for example 2-3 V) which is customary for modern CMOS technologies. In this case, "too low" means that the maximum possible compliance voltage $V_C$ is not sufficient in order to set the cell voltage $V_{CELL}$ to the desired value.

It is self-evident that the interface circuit 20 illustrated in FIG. 1 represents only one possible implementation and a person skilled in the art is able to implement the same functionality in a different way too. For example, the electrode voltage $V_{RE}$ at the reference electrode RE could be measured by means of an analog/digital converter and the voltages $V_{WE}$ and $V_{CE}$ at the working electrode and the counterelectrode WE, CE could be generated by means of digital/analog converters, where the voltages can be set digitally in this example, for example by means of a programmable microcontroller which sets the digital input signals of the digital/analog converters such that the measurement value for the electrode voltage $V_{RE}$ which is displayed by the analog/digital converter assumes the desired value.

Figure 2:
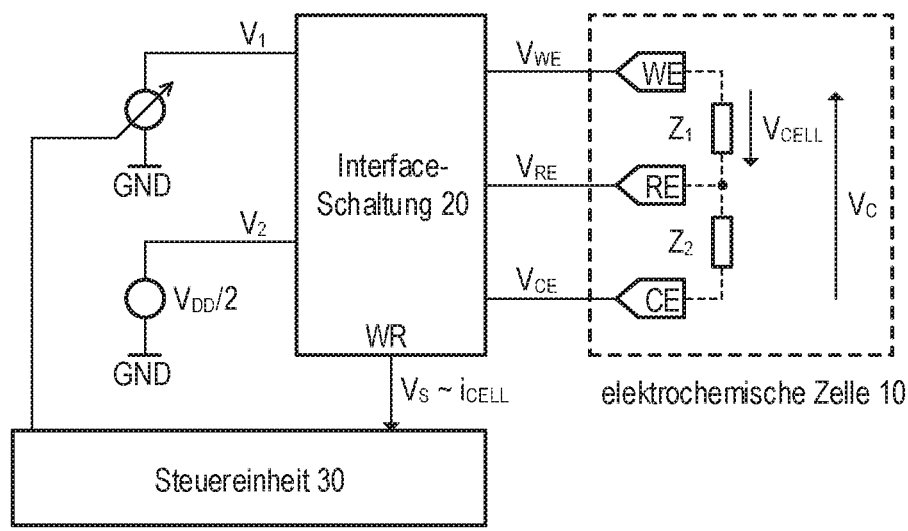
FIG. 2 shows a block diagram of a system for carrying out voltammetric and related analysis methods.

FIG. 2 shows a block diagram of a system for carrying out voltammetric and related analysis methods comprising an electrochemical cell 10, an interface circuit 20 (see FIG. 1 for example) and a control unit 30 which is designed to control the measurement process and to evaluate the resulting signals. The specific implementation of the interface circuit (for example analogously to FIG. 1 or a partially digital implementation) is not further relevant for this purpose. In the present example, the electrochemical cell 10 is of identical construction to that in the example from FIG. 1.

The interface circuit 20 is usually configured such that the voltage $V_{RE}$ of the reference electrode RE is half the supply voltage $V_{DD}$ ($V_{RE}=V_2=V_{DD}/2$). In the case of a bipolar, symmetrical supply voltage, the voltage $V_{RE}$ can be set to 0 volt.

In the illustrated example, the control unit 30 is designed to vary the voltage $V_1$ in accordance with a desired signal waveform. From this, the interface circuit 20 generates the voltage $V_{WE}$ of the working electrode WE and the voltage $V_{CE}$ of the counterelectrode CE, where the voltage $V_{CE}$ is set such that the voltage $V_{WE}$ of the working electrode WE follows the (variable) input voltage $V_1$, while the voltage $V_{RE}$ at the currentless reference electrode remains constant. The control unit 30 receives the measurement value $V_S$, which represents the electrode current $i_{CELL}$, from the interface circuit 20. It should be noted at this point that the voltage $V_{RE}$ of the reference electrode RE can also be varied according to a desired signal waveform, while the working electrode WE is at a constant voltage $V_{WE}$ (for example $V_{WE}=V_{DD}/2$).

Figure 3:
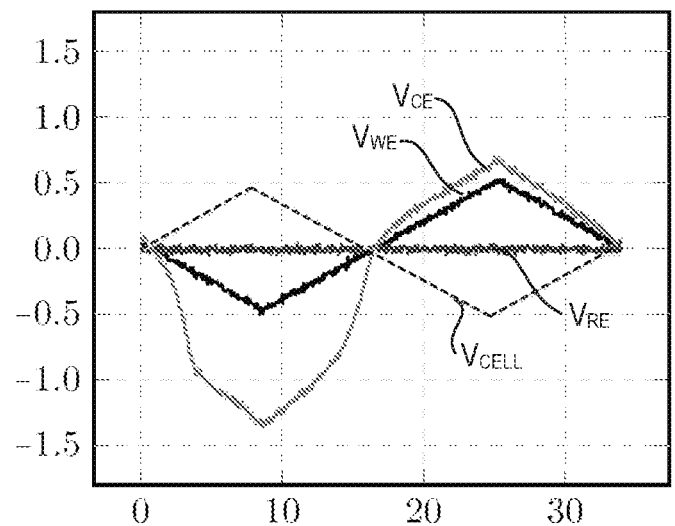
FIG. 3 shows a graph of the signal waveforms at the electrodes of a cell during cyclic voltammetry.

FIG. 3 shows a graph of exemplary signal waveforms at the electrodes of the cell 10 during cyclic voltammetry. According to FIG. 3, the voltage $V_{WE}$ of the working electrode WE is periodically varied in accordance with a triangular waveform signal, while the reference electrode RE is at a constant voltage $V_{RE}$. The resulting voltage $V_{CE}$ of the counterelectrode CE and the electrode current $i_{CELL}$ (not illustrated in FIG. 3) can be considered to be measurement signals which can then be evaluated using methods which are known per se in order to ascertain the sought properties of the electrolyte in the cell 10.

In the example illustrated in FIG. 3, the interface circuit 20 is operated with a bipolar supply voltage (for example +/−3 V). The maximum value of the periodically varying cell voltage $V_{CELL}$ ($V_{CELL}=V_{WE}-V_{RE}$) is 0.5 volt. In this case, the voltage $V_{CE}$ of the counterelectrode, which voltage is required for this purpose (in order to keep the reference voltage constant at approximately 0 V) reaches a minimum value of approximately −1.3 volt. Therefore, a voltage range of 1.8 V between the minimum value and the maximum value is covered in this case. If, in the case of a unipolar supply voltage of $V_{DD}=2$ volt, the reference voltage were set to $V_{DD}/2=1$ V, the graph according to FIG. 3 would shift upward by one volt and the required voltage range would lie between approximately −0.3 volt and 1.5 volt, this not being possible in the case of a unipolar supply since no negative output voltages can be generated. The examples described here provide a way of better utilizing the available voltage ranges of the interface circuit, this rendering possible the use of expedient CMOS technologies.

Figure 4:
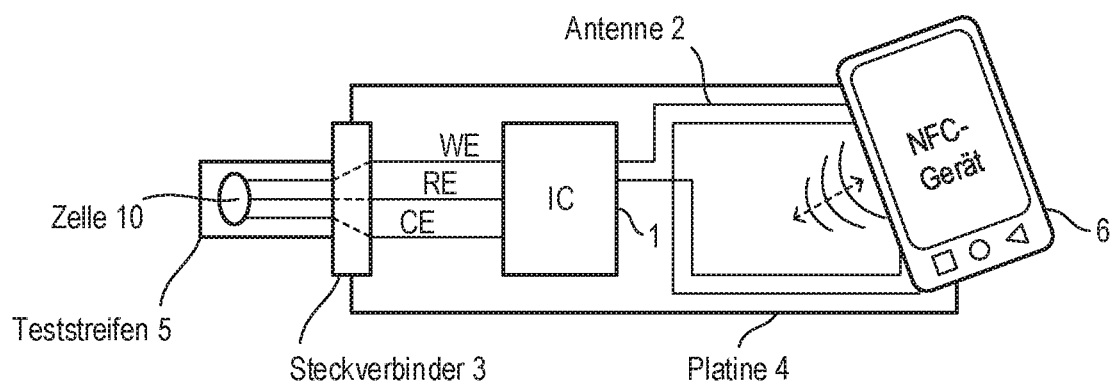
FIG. 4 schematically illustrates a measurement system for carrying out voltammetric measurements using with an NFC interface to a mobile device, such as for example: a mobile telephone or a tablet PC (NFC=near-field communication).

Before various examples are explained in more detail, an example of the overall system in which the concepts and exemplary embodiments described here can be used will be described with reference to FIG. 4. According to FIG. 5, the interface circuit 20 and all further circuits which are required for voltammetry on an electrochemical cell 10 are integrated in an integrated circuit (IC) 1. The integrated circuit 1 is mounted on a printed circuit board 4 on which on an antenna for near-field communication (NFC) is arranged (for example by means of strip lines). The IC 1 is connected to said antenna and also comprises an NFC communication interface. A plug-in connector 3 which is designed to connect a test strip 5 on which the electrochemical cell 10 is located can also be provided on the printed circuit board 4. The electrodes WE, RE and CE are connected to the IC 1 by means of the plug-in connector 3. In the illustrated example, the voltages to be set (see FIGS. 1 and 2, input voltages $V_1$ and $V_2$) can be set by an NFC device 6 (for example a mobile telephone, a tablet PC etc.) via the NFC communication interface of the IC 1. Furthermore, the measurement values (for example voltage of the counterelectrode $V_{CE}$ and cell current $i_{CELL}$) can be transmitted to the device 6 by means of NFC and evaluated by said device. The function of the NFC device 6 is determined by a software application in this case. It should be mentioned at this point that the plug-in connector 3 and the separate test strip can be dispensed with if the cell 10, the IC 1 and the antenna 2 are arranged together on a carrier (for example printed circuit board 4). Therefore, the test strip 5 and the plug-in connector 3 are optional.

Modifications to the example from FIG. 2 which render possible flexible adjustment of the voltage range required for a voltammetric measurement will be described below. In the example illustrated in FIG. 5, the electrochemical cell 10 and the interface circuit 20 are substantially identical to those in the example according to FIG. 2. However, the "position" of the voltage $V_2$ and therefore the voltage range required for a measurement can be set in a flexible manner. According to FIG. 5, the control unit 30 comprises a detector circuit 31 which is designed to ascertain the minimum $V_{MIN}$ and the maximum $V_{MAX}$ of the voltages $V_{WE}$, $V_{RE}$ and $V_{CE}$. The voltage $V_{WR}=V_{WE}-V_S=V_{WE}-i_{CELL}R_S$ (see FIG. 1) can also be taken into consideration when detecting the minimum and the maximum. The question as to whether it is necessary to take into account the voltage $V_{WR}$ which represents the cell current depends on the specific implementation of the measurement of the cell current $i_{CELL}$. The control unit 30 can further have a (for example analogously implemented) regulator 32 which is designed to ascertain a setpoint value for the voltage $V_2$ (and therefore for the reference voltage $V_{RE}$) based on the detected minimum $V_{MIN}$ and the detected maximum $V_{MAX}$. In the illustrated example, the voltage $V_2$ is set such that the minimum $V_{MIN}$ and the maximum $V_{MAX}$ are symmetrical around the midpoint of the supply voltage range. In the case of unipolar supply with the supply voltage $V_{DD}$, the midpoint is exactly at $V_{DD}/2$. In the case of symmetrical bipolar supply, the midpoint would be at 0 V.

The control unit 30 can furthermore have a signal generator 33 which is designed to provide the voltage $V_1$. This is—depending on measurement—for example a periodic triangular waveform voltage $V_{AC}$ plus an offset which can correspond to the voltage $V_2$. In this case, the cell voltage $V_{CELL}=V_1-V_2$ corresponds precisely to said periodic triangular waveform voltage $V_{AC}$ ($V_{CELL}=V_{AC}$) with a mean value of 0 V. However, the cell voltage $V_{CELL}$ does not necessarily have to have a zero mean value.

Adjustment of the voltage $V_2$ can (approximately) result in the voltage range required for a measurement always being approximately symmetrical around half the supply voltage $V_{DD}/2$. If, for example, $V_{MIN}=0.3$ $V_{DD}$ and $V_{MAX}=0.7$ $V_{DD}$, $0.5 \cdot (V_{MAX}+V_{MIN})$ is equal to $V_{DD}/2$ and the voltage $V_2$ (and therefore also the electrode voltage $V_{RE}$) is in a steady state. If the voltage range required for a measurement is—for whatever reason—higher, for example $V_{MIN}=0.4$ $V_{DD}$ and $V_{MAX}=0.8$ $V_{DD}$, $0.5 \cdot (V_{MAX}+V_{MIN})$ is equal to 0.6 $V_{DD}$ and the voltage $V_2$ is reduced, this resulting in the voltage range between $V_{MIN}$ and $V_{MAX}$ being shifted downward until it is symmetrical around half the supply voltage. This adaptive setting of the reference voltage $V_2$ (which corresponds to the electrode voltage $V_{RE}$) renders possible efficient utilization of the available supply voltage.

Figure 6:
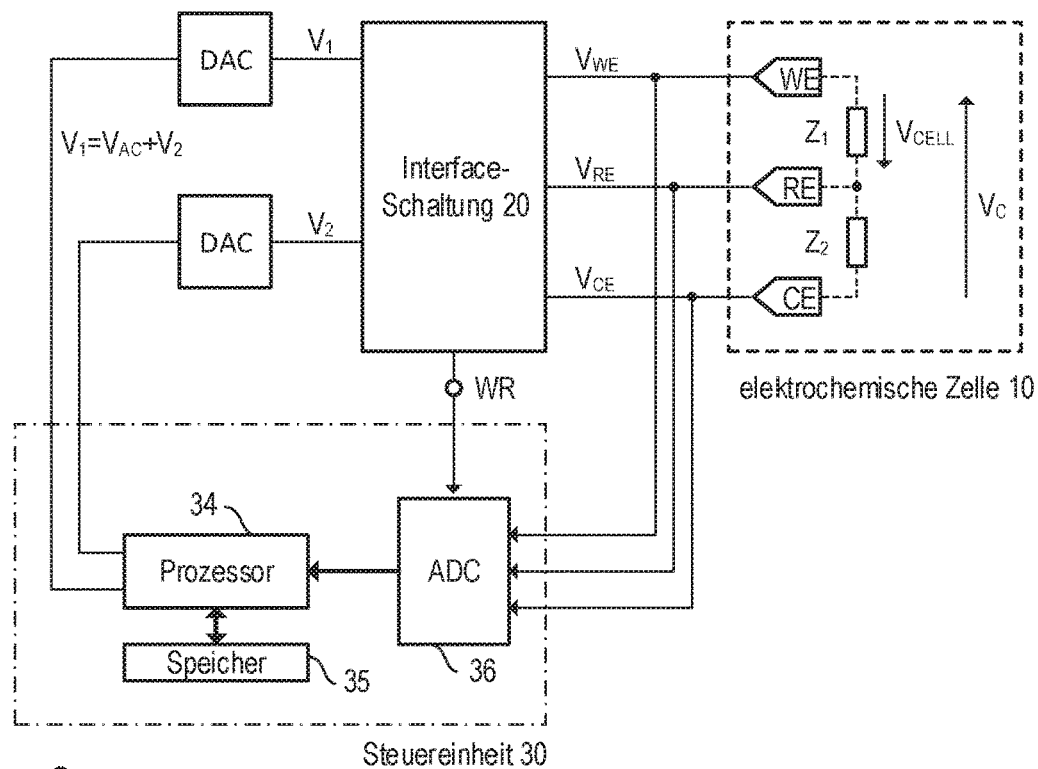
FIG. 6 is a digital implementation of the example from FIG. 5.

The functionality of the control unit can also be at least partially digitally implemented. One example of this is illustrated in FIG. 6. In this example, the control unit 30 comprises one or more analog/digital converters (ADCs) 36 which is/are designed to digitize the electrode voltages $V_{WE}$, $V_{RE}$, $V_{CE}$ and (optionally) also the voltage $V_{WR}$ (see FIG. 1). The digitized values can be further processed by means of a processor 34. To this end, the processor 34 executes software instructions which can be stored in a memory 35. The processor 34 can be programmed such that digital setpoint values for the voltages $V_1$ and $V_2$ are continuously calculated. Said digital values can be converted, for example by means of the digital/analog converters (DACs) illustrated in FIG. 6, into the voltages $V_1$ and $V_2$ which in turn are supplied as input voltages to the interface circuit 20. The processor 34 can calculate the voltage $V_2$ (that is to say the associated digital value) in line with a regulation algorithm which has substantially the same function as the regulator 32 from the example in FIG. 30. However, other algorithms can also be used for adapting the voltage $V_2$.

Figure 7:
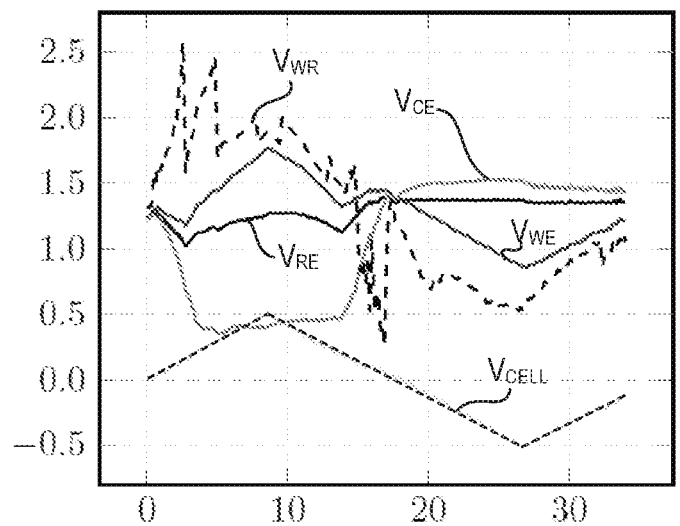
FIG. 7 shows a graph of the signal waveforms at the electrodes of a cell during cyclic voltammetry in the example according to FIG. 5.

The adjustment of the voltage $V_2$ is not necessarily performed once per period of the cell voltage $V_{CELL}$. The voltage $V_2$ can also already be adjusted during one period of the cell voltage $V_{CELL}$ and therefore with a considerably shorter time constant than the period duration of the cell voltage $V_{CELL}$. As a result, the voltage $V_2$ and therefore also the reference voltage $V_{RE}$ are not constant in sections either but rather vary substantially continuously even within a period of the cell voltage $V_{CELL}$. An example of this is illustrated in FIG. 7. The continuous adjustment of the reference voltage $V_{RE}$ renders possible (even in the case of unipolar supply) a cell voltage $V_{CELL}$ which is symmetrical around zero volt (periodic triangular waveform voltage), whereas the other voltages $V_{RE}$, $V_{WE}$, $V_{CE}$ and $V_{WR}$ are between approximately 0.4 V ($V_{MIN}$) and 2.6 V ($V_{MAX}$), for which reason a unipolar supply voltage $V_{DD}$ of 3 V is sufficient for operating the interface circuit 20. The voltage values $V_{MIN}$ and $V_{MAX}$ are therefore symmetrical in relation to the midpoint of the supply voltage range, in the case of unipolar supply with a positive supply voltage $V_{DD}$ relative to ground (0 V), that is to say symmetrical in relation to $V_{DD}/2$. It should also be mentioned at this point that the cell voltage $V_{CELL}$ does not necessarily have to run symmetrically around 0 V, but rather can also have an (adjustable) offset.

Figure 5:
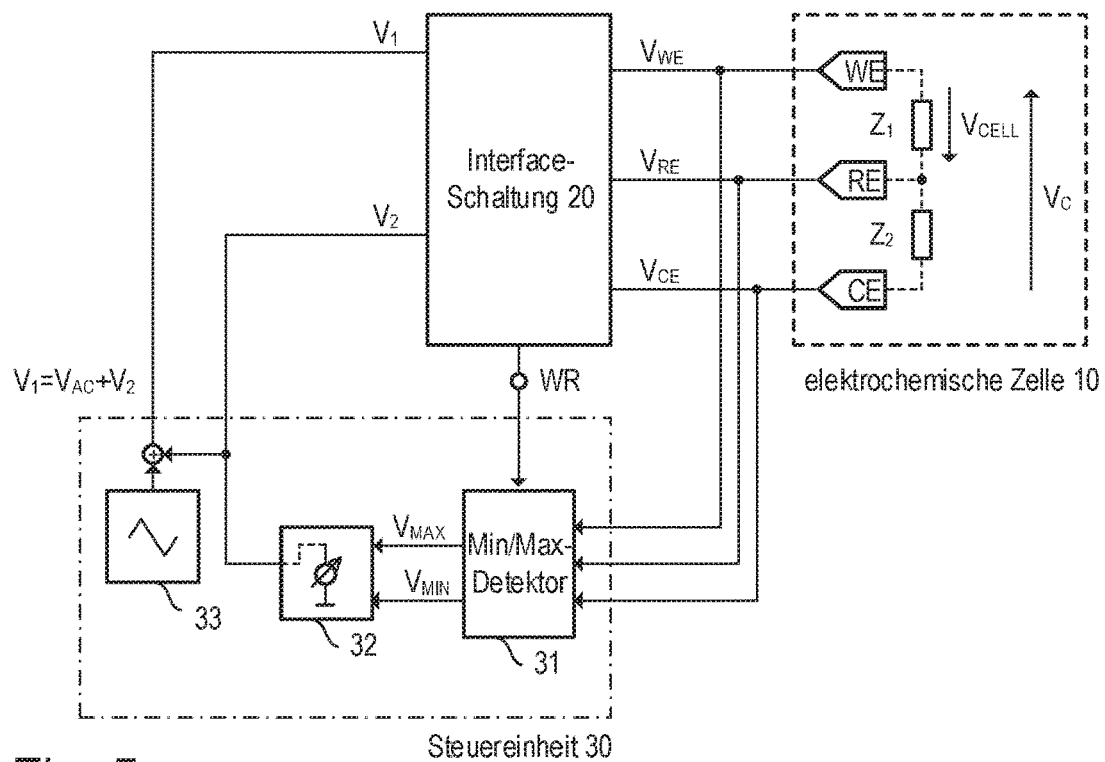
FIG. 5 illustrates a first exemplary embodiment of a system for carrying out voltammetric and related analysis methods, where the reference voltage can be adaptively set.
Figure 8:
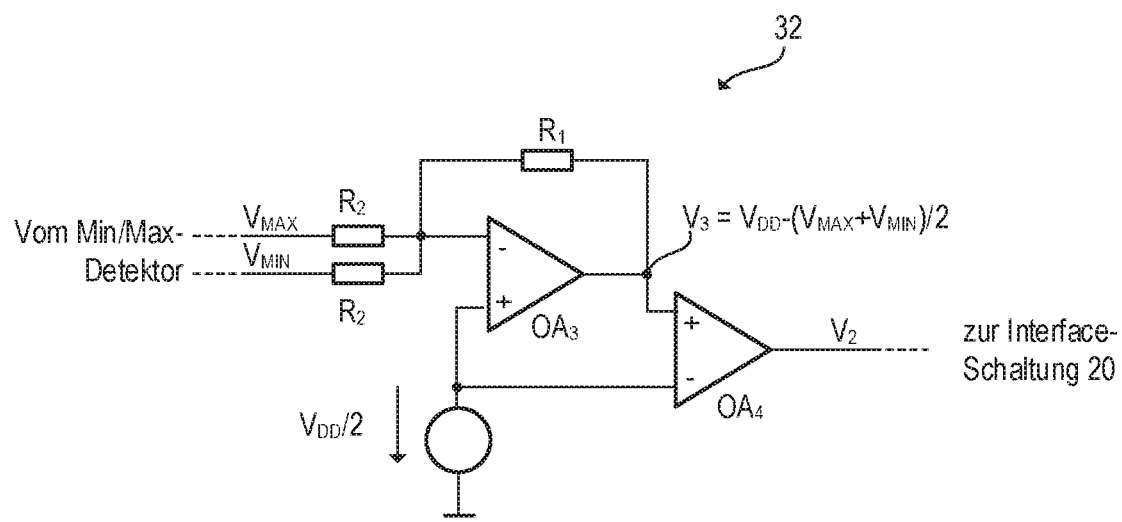
FIG. 8 illustrates an exemplary implementation of a circuit for generating the reference voltage for the electrochemical cell in the example according to FIG. 5.

FIG. 8 illustrates an example of an analog implementation of the regulator 32 (see FIG. 5). Half the supply voltage $V_{DD}/2$ is supplied to a non-inverting input of an operational amplifier $OA_3$. The inverting input of the operational amplifier $OA_3$ is connected to the output of the operational amplifier $OA_3$ via a resistor $R_1$ and to two input nodes, to which the detected minimum and maximum values $V_{MIN}$ and $V_{MAX}$ are applied (these are provided by the, for example, by the detector circuit 31, see FIG. 5), via a resistor $R_2$ in each case. If the resistance values of the resistors $R_2$ are twice as high as the resistance value of the resistor $R_1$ ($R_2=2R_1$), the output voltage $V_3$ of the operational amplifier $OA_3$ is then equal to $$V_3 = V_{DD} - (V_{MAX} \pm V_{MIN})/2. \tag{1}$$

The output voltage $V_3$ of the operational amplifier $OA_3$ and also half the supply voltage $V_{DD}/2$ are supplied to a further operational amplifier $OA_4$ which generates the voltage $V_2$ at its output. The operational amplifier $OA_4$ sets its output voltage such that the equation $$V_3 = V_{DD} - (V_{MAX} \pm V_{MIN})/2 = V_{DD}/2 \tag{2}$$

is satisfied (in the steady state). The minimum $V_{MIN}$ and the maximum $V_{MAX}$ are therefore symmetrical around the value $V_{DD}/2$. The operational amplifier $OA_4$ is subjected to feedback via the interface circuit 20, the cell 10 and the detector circuit 31, this possibly leading to stability problems in practice. Depending on the implementation, a low-pass filter can further be connected between the output of the operational amplifier $OA_4$ and the interface circuit in order to avoid high-frequency oscillations and instabilities.

It is self-evident that the illustrated variant is merely one of many possible implementations which a person skilled in the art can readily implement. Alternative circuits can be implemented, for example, by means of switched capacitors.

Figure 9:
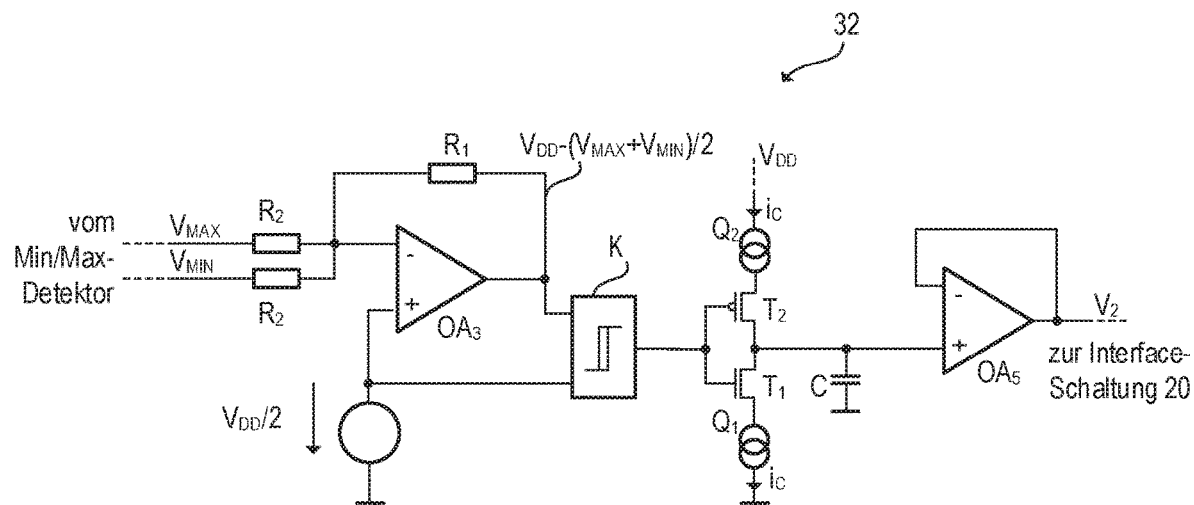
FIG. 9 illustrates a further exemplary implementation which can be used as an alternative to the circuit from FIG. 8.

FIG. 9 illustrates a further, analogous implementation example for the regulator 32 (cf. FIG. 5). The right-hand-side part of the circuit from FIG. 9 (that is to say the operational amplifier $OA_3$ with the resistors $R_1$ and $R_2$) is identical to that in the previous example from FIG. 8; the output voltage $V_3$ of the operational amplifier is accordingly $V_{DD}-(V_{MAX}\pm V_{MIN})/2$. The comparator $K_1$ compares the voltage $V_3$ with half the supply voltage $V_{DD}/2$ and provides a high level at its output if the condition $V_3 < V_{DD}/2$ is satisfied, this being equivalent to $$(V_{MAX}+V_{MIN})/2 > V_{DD}/2. \tag{3}$$

Otherwise, the comparator $K_1$ generates a low level at its output. In practice, the comparator can have a small hysteresis. The output of the comparator $K_1$ is connected to the gates of the transistors $T_1$ and $T_2$, where the transistor $T_1$ turns on in response to a high level of the comparator $K_1$ and the transistor $T_2$ turns on in response to a low level of the comparator $K_1$. Conversely, the transistor $T_1$ is off given a low level at the output of the comparator $K_1$, and the transistor $T_2$ is off given a high level at the output of the comparator $K_1$.

The transistors $T_1$ and $T_2$ are to a capacitor C, the current sink $Q_1$ and the current source $Q_2$ such that—when the transistor $T_1$ is turned on (that is to say if $(V_{MAX}+V_{MIN})/2 > V_{DD}/2$)—the capacitor C is connected to the current sink $Q_2$, and discharged by said current sink. Equally when the transistor $T_2$ is turned on (that is to say if $(V_{MAX}+V_{MIN})/2 < V_{DD}/2$)—the capacitor C is connected to the current source $Q_1$ and is charged by said current source (charge/discharge current $i_C$). The operational amplifier $OA_5$ is connected to the capacitor C and serves as a buffer amplifier for the capacitor voltage. In the present example, the amplification of the buffer amplifier is one (this does not necessarily have to be the case.

As can be seen in FIG. 9, the illustrated circuit operates like a two-point regulator or, if the comparator $K_1$ has a hysteresis, like a three-point regulator, where the speed of the regulation is dependent on the capacitance of the capacitor C and the value of the current $i_C$ of the current sources $Q_1$ and $Q_2$.

Figure 10:
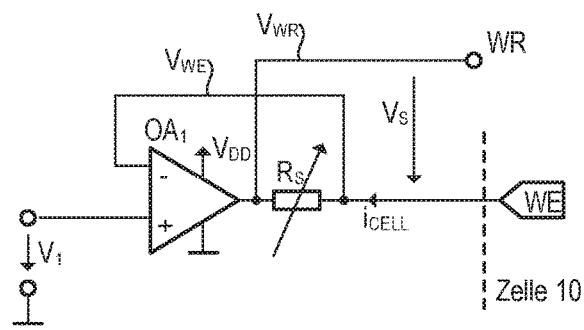
FIG. 10 illustrates a modification to the interface circuit from FIG. 1.

FIG. 10 illustrates a modification to the interface circuit from FIG. 1, where only the upper part of the interface circuit 20 is illustrated. In the present example, the shunt resistor which is used for the current measurement is adjustable. The adjustable shunt resistor can be implemented in various ways. For example, a changeover can be made between different shunt resistors by means of electronic switches. As already mentioned further above, the voltage $V_{WR}$ which represents the cell current $i_{CELL}$ ($i_{CELL}=(V_{WE}-V_{WR})/R_S$) can likewise be taken into account by the detector circuit 31 (see FIG. 5). In this case, the maximum (and also the minimum) of the voltages $V_{WR}$, $V_{WE}$, $V_{CE}$ and $V_{RE}$ is ascertained, that is to say $V_{MAX}=\max\{V_{WR}, V_{WE}, V_{CE}, V_{RE}\}$ and $V_{MIN}=\min\{V_{WR}, V_{WE}, V_{CE}, V_{RE}\}$.

The use of a higher resistance value for the shunt resistor $R_S$ generally renders possible a better signal-to-noise ratio and therefore a higher degree of accuracy when ascertaining the cell current $i_{CELL}$. When a changeover is made from a relatively low-value shunt resistor to a higher-value shunt resistor, the voltage $V_{WR}$ may theoretically become larger than the supply voltage $V_{DD}$, this resulting in the operational amplifier $OA_1$ no longer being able to generate the desired electrode voltage $V_{WE}$ (and therefore also the desired cell voltage $V_{CELL}$) at least until the regulator 32 (see FIG. 5) has adjusted the reference voltage downward. In order to prevent a temporary dip in the cell voltage $V_{CELL}$, a relatively high voltage $V_{WR}$ can be "simulated" for the minimum/maximum detector 31 before the changeover is made. That is to say, the detector 31 "sees", instead of the voltage $V_{WR}$, a higher voltage $V_{WR}'$ (for example $V_{WR}'=V_{DD}$ or $V_{WR}'=V_{DD}+\Delta R_S \cdot i_{CELL}$) before the value of the shunt resistor $R_S$ is increased by a specific amount $\Delta R_S$. This allows the regulator 32 to respond and to set a new operating point (the reference voltage $V_2$) which is suitable for the higher-value shunt resistor.

Figure 11:
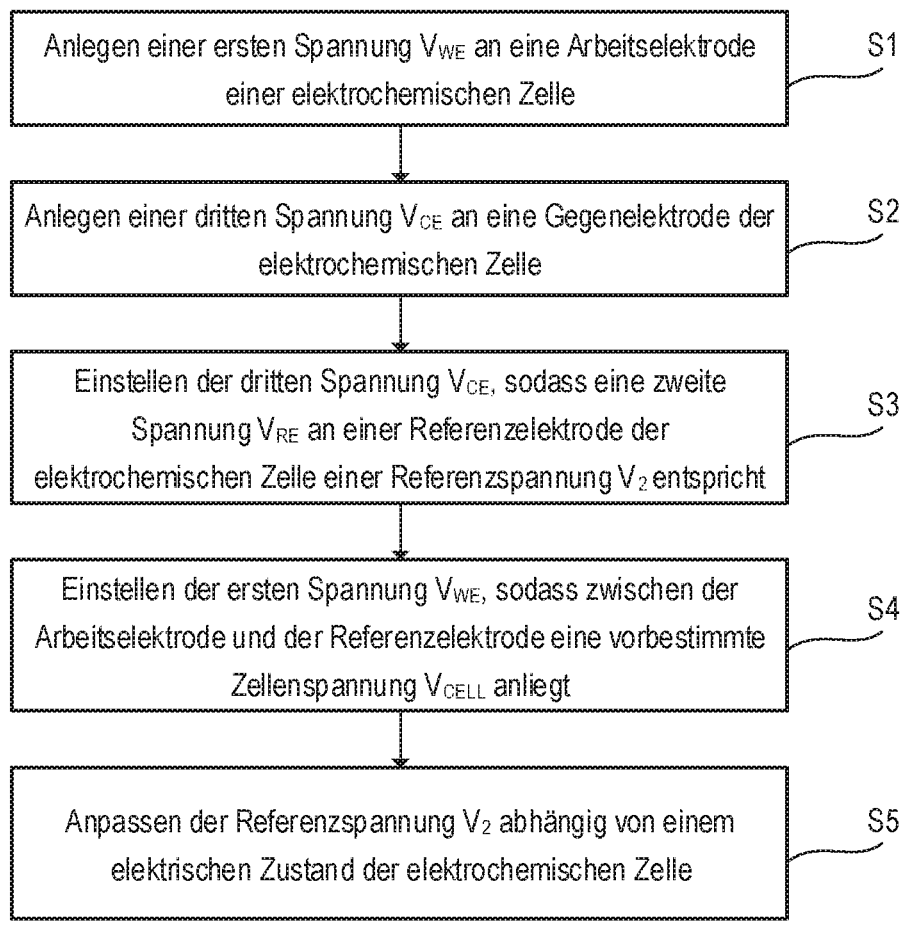
FIG. 11 illustrates an example of the method described here using a flowchart.
Figure 1:
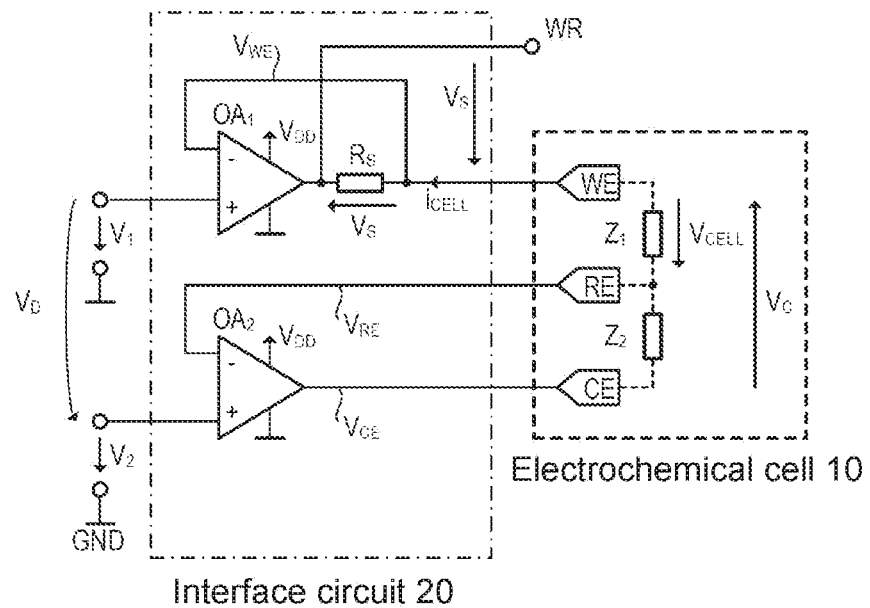
Figure 2:
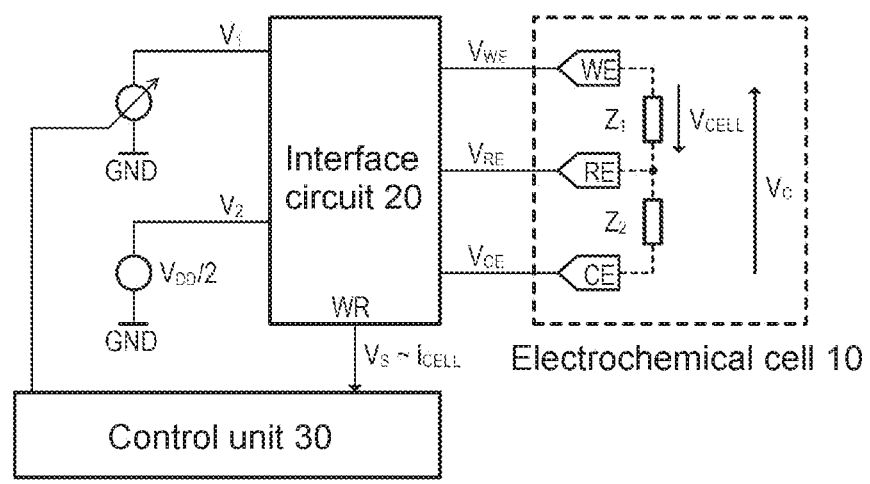
Figure 3:
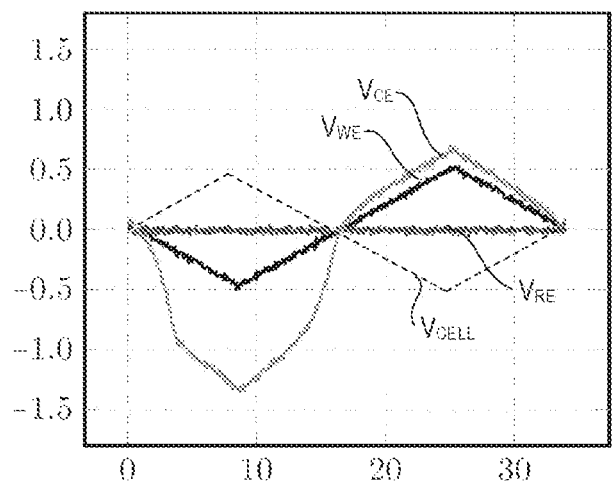
Figure 4:
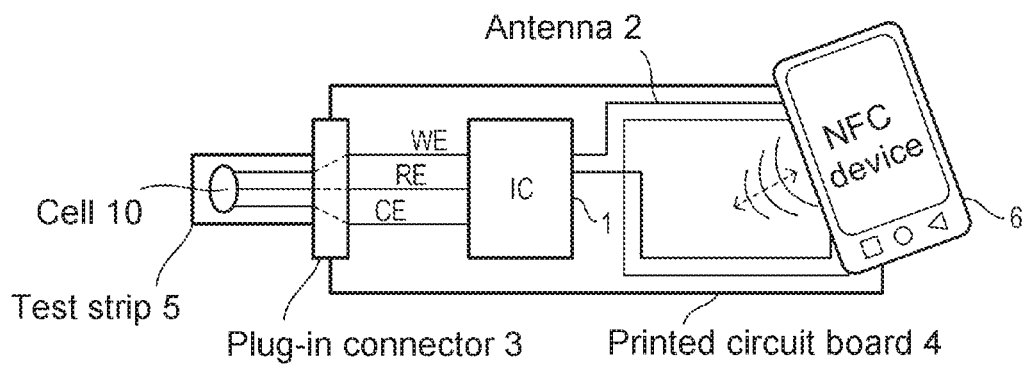
Figure 5:
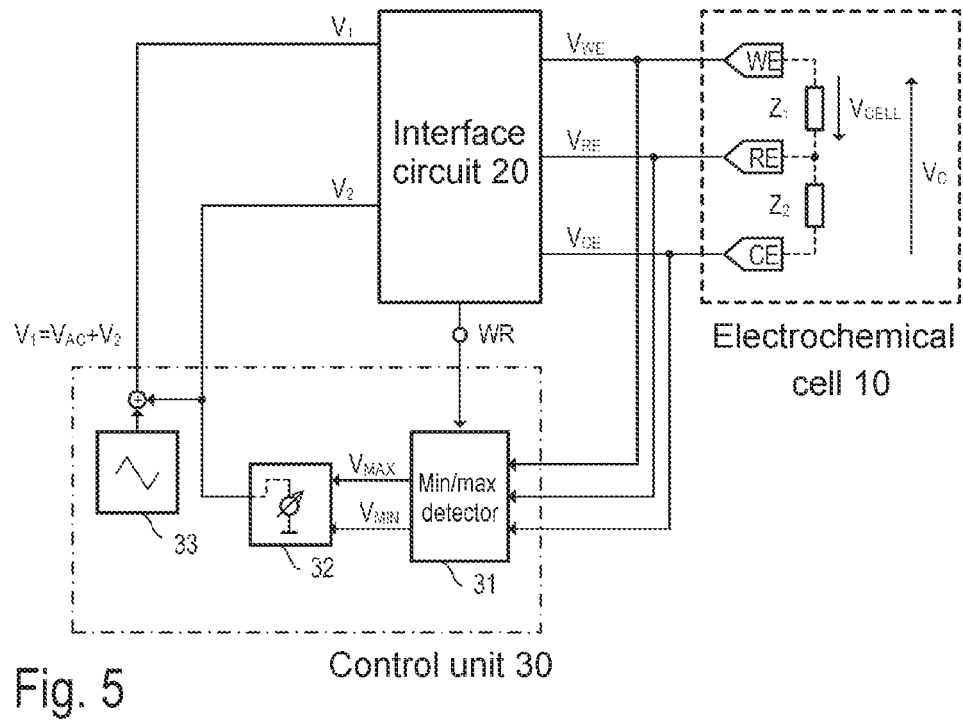
Figure 6:
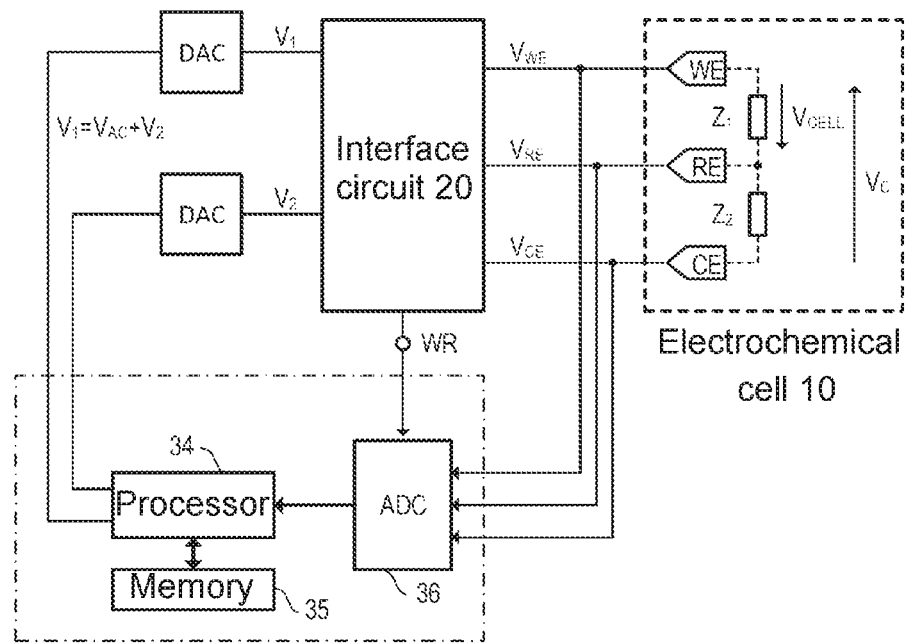
Figure 7:
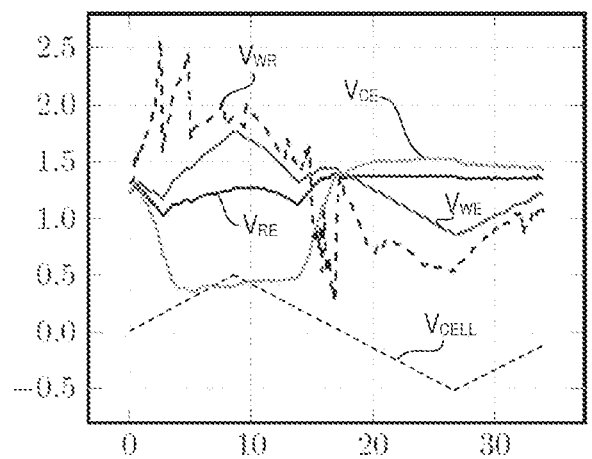
Figure 8:
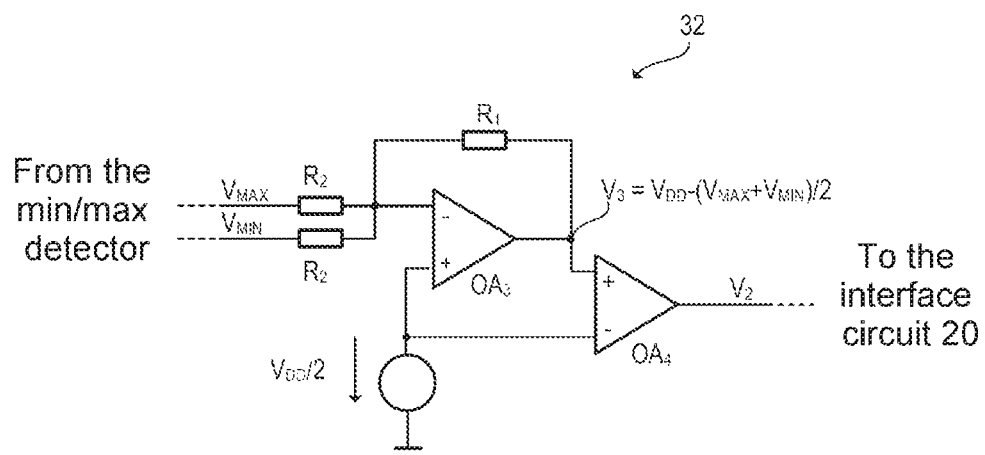
Figure 9:
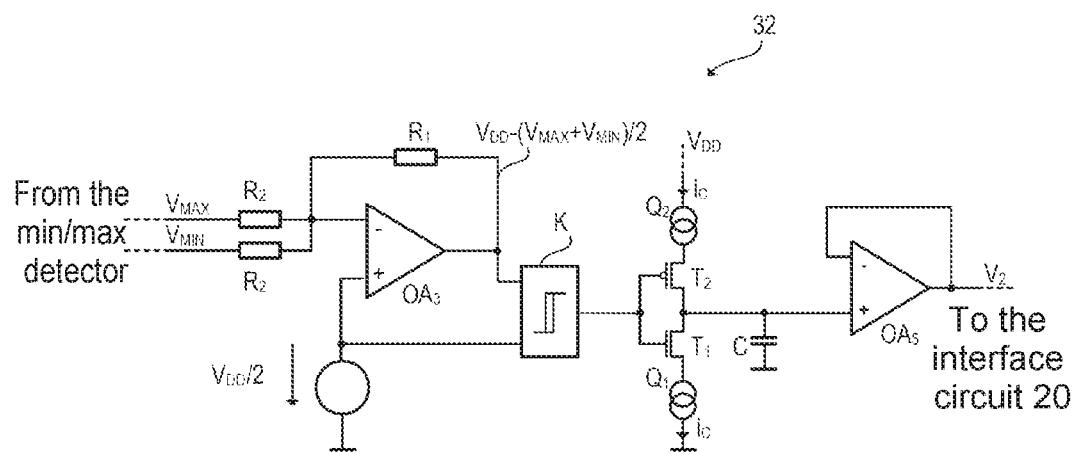
Figure 10:
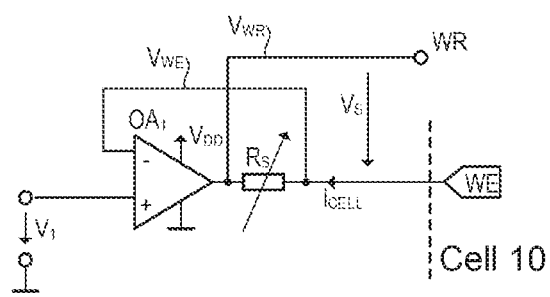
Figure 11:
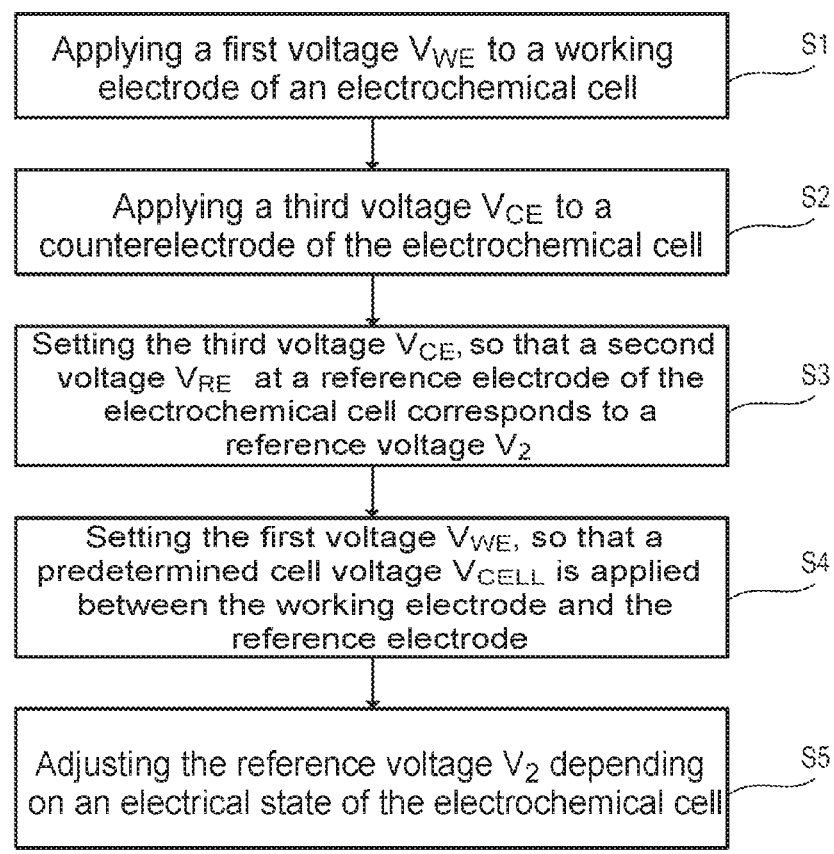

An example of the method which is carried out, for example, with the aid of the system from FIG. 5 or 6 is summarized using the flowchart in FIG. 11. What follows is not a complete, but rather merely an exemplary, explanation of the method steps carried out, which method steps do not necessarily have to be carried out in the order described here. According to FIG. 11, a first voltage (electrode voltage $V_{WE}$) is applied to a first electrode (working electrode WE, see FIG. 5 for example) of an electrochemical cell 10 (FIG. 11, step S1). A third voltage (electrode voltage $V_{CE}$) is applied to a third electrode (counterelectrode CE, see FIG. 5 for example) (FIG. 11, step S2). In the process, the electrode voltage $V_{CE}$ is set (for example by means of a feedback amplifier, cf. FIG. 1, operational amplifier $OA_2$ for example) such that a second voltage (electrode voltage $V_{RE}$) at a second electrode (reference electrode RE, see FIG. 5 for example) of the electrochemical cell corresponds to a reference voltage $V_2$ (FIG. 11, step S3). The method further comprises setting/varying the electrode voltage $V_{WE}$ in such a way that a desired cell voltage $V_{CELL}$ (for example which is variable over time) is applied between the working electrode and the reference electrode (FIG. 11, step S4). The reference voltage $V_2$ is adjusted depending on an electrical state of the electrochemical cell (FIG. 11, step S5).

The electrical state of the electrochemical cell is represented, in particular, by the electrode voltages $V_{WE}$, $V_{RE}$ and $V_{CE}$. In one exemplary embodiment, the cell current $i_{CELL}$ (for example a voltage value which represents the cell current) can additionally be taken into account too. The reference electrode is substantially currentless and the cell current flows from the working electrode to the counterelectrode.

In some exemplary embodiments, adjusting the reference voltage $V_2$ depending on an electrical state of the electrochemical cell comprises ascertaining a maximum value $V_{MAX}$ and a minimum value $V_{MIN}$ of the electrode voltages $V_{WE}$, $V_{RE}$ and $V_{CE}$, that is to say $V_{MAX}=\max\{V_{WE}, V_{RE}, V_{CE}\}$ and $V_{MIN}=\min\{V_{WE}, V_{RE}, V_{CE}\}$. In other words, the maximum value $V_{MAX}$ is the maximum of the upper peak values and the minimum value $V_{MIN}$ is the minimum of the lower peak values of the electrode voltages $V_{WE}$, $V_{RE}$ and $V_{CE}$. The reference voltage $V_2$ is then changed (regulated) depending on the ascertained maximum value and the ascertained minimum value. In one exemplary embodiment, the voltage value which represents the cell current $i_{CELL}$ is also taken into account when ascertaining the maximum value $V_{MAX}$ and the minimum value $V_{MIN}$ (see FIG. 1, voltage $V_{WR}$ for example).

Said voltage value which represents the cell current $i_{CELL}$ can be dependent on the resistance value of the shunt resistor which is used for the current measurement. Said shunt resistor can be variable. For the purpose of determining the maximum value $V_{MAX}$ and the minimum value $V_{MIN}$, the voltage value which represents the cell current $i_{CELL}$ can be temporarily raised or lowered before the resistance value of the shunt resistor $R_S$ is changed (for example switched over) (cf FIG. 10 and the associated description too).

The invention claimed is:
1. A circuit arrangement comprising:
a first output node for connection to a first electrode of an electrochemical cell, a second output node for connection to a second electrode of the electrochemical cell, and a third output node for connection to a third electrode of the electrochemical cell;
an interface circuit which is designed to output a first voltage at the first output node, and which is further designed to output a third voltage at the third output node, wherein the third voltage is set such that a second voltage at the second output node corresponds to a reference voltage; and
a control unit which is designed to set the first voltage such that a predetermined cell voltage is applied between the first and the second output node, and which is further designed to adjust the reference voltage depending on the electrical state of the electrochemical cell,
wherein the electrical state of the electrochemical cell is represented by the first voltage, the second voltage, and the third voltage, or
wherein the electrical state of the electrochemical cell is represented by the first voltage, the second voltage, the third voltage, and a cell current.

2. The circuit arrangement according to claim 1, wherein substantially no current flows through the second output node.

3. The circuit arrangement according to claim 1, wherein the control unit includes a detector circuit which is designed to determine a minimum value and a maximum value of the first, second, and third voltages which are present at the first, second, and third output nodes, and
a regulator which is designed to adjust the reference voltage depending on the detected minimum value and the detected maximum value.

4. The circuit arrangement according to claim 1, wherein the control circuit includes an analog/digital converter circuit which is designed to digitize the voltages at the output nodes, and the control circuit also includes a processor which is designed to calculate a digital setpoint value for the reference voltage based on the digitized voltages.

5. A circuit arrangement comprising:
a first output node for connection to a first electrode of an electrochemical cell, a second output node for connection to a second electrode of the electrochemical cell, and a third output node for connection to a third electrode of the electrochemical cell;
an interface circuit which is designed to output a first voltage at the first output node, and which is further designed to output a third voltage at the third output node, wherein the third voltage is set such that a second voltage at the second output node corresponds to a reference voltage; and a control unit which is designed to set the first voltage such that a predetermined cell voltage is applied between the first and the second output node, and which is further designed to adjust the reference voltage depending on the electrical state of the electrochemical cell, wherein the electrical state of the electrochemical cell is represented at least by the first voltage, the second voltage, the third voltage and a fourth voltage which represents a cell current, and wherein the control unit has a detector circuit which is designed to determine a minimum value of the first, second, third and fourth voltage and also a maximum value of the first, second, third and fourth voltage.

6. A method comprising:

applying a first voltage to a first electrode of an electrochemical cell;

applying a third voltage to a third electrode of the electrochemical cell, wherein the third voltage is set such that a second voltage at a second electrode of the electrochemical cell corresponds to a reference voltage;

setting the first voltage so that a predetermined cell voltage is applied between the first and the second electrode, and adjusting the reference voltage depending on an electrical state of the electrochemical cell, wherein the electrical state of the electrochemical cell is represented by the first voltage, the second voltage, and the third voltage, or wherein the electrical state of the electrochemical cell is represented by the first voltage, the second voltage, the third voltage, and a cell current.

7. The method according to claim 6, wherein the second electrode is substantially currentless and a cell current flows between the first electrode and the third electrode.

8. The method according to claim 7, the method further comprising:

providing a fourth voltage which represents the cell current, wherein adjusting the reference voltage depending on an electrical state of the electrochemical cell comprises:

determining a maximum value and a minimum value of the first, second, third and fourth voltages; and changing the reference voltage depending on the maximum value and the minimum value.

9. The method according to claim 8, wherein the fourth voltage is dependent on the resistance value of a shunt resistor through which the cell current flows, and wherein, for the purpose of determining the maximum value and the minimum value, the fourth voltage is temporarily raised or lowered before the resistance value of the shunt resistor is changed.

10. The method according to claim 6, wherein adjusting the reference voltage depending on an electrical state of the electrochemical cell comprises:

determining a maximum value and a minimum value of the first voltage, the second voltage, and the third voltage; and changing the reference voltage depending on the maximum value and the minimum value.

11. The method according to claim 6, wherein the first voltage is set such that the cell voltage follows a predefined signal waveform.

* * * * *